United States Patent [19]

Kanamuller

[11] 4,253,125
[45] Feb. 24, 1981

[54] HEAD LOADING AND UNLOADING MECHANISM FOR MAGNETIC FLEXIBLE DISK

[75] Inventor: Frank X. Kanamuller, Glenside, Pa.

[73] Assignee: Sperry Corporation, Blue Bell, Pa.

[21] Appl. No.: 21,372

[22] Filed: Mar. 19, 1979

[51] Int. Cl.³ .......................... G11B 5/48; G11B 21/12
[52] U.S. Cl. ........................................ 360/99; 360/98; 360/105; 360/86
[58] Field of Search ............................ 360/99, 97-98, 360/86, 135, 102-103, 104-106

[56] References Cited

U.S. PATENT DOCUMENTS

| | | | |
|---|---|---|---|
| 3,702,997 | 11/1972 | Jamieson | 360/98 |
| 3,946,439 | 3/1976 | Castrodale et al. | 360/99 |
| 4,001,888 | 1/1977 | Morgan | 360/98 |
| 4,085,428 | 4/1978 | Green et al. | 360/99 |
| 4,151,573 | 4/1979 | Tandon et al. | 360/99 |
| 4,167,766 | 9/1979 | Chau | 360/104 |

Primary Examiner—Alfred H. Eddleman
Attorney, Agent, or Firm—Rene A. Kuypers

[57] ABSTRACT

A loading-unloading mechanism for magnetic heads used with a double-sided, rotating, flexible, magnetic disk is disclosed wherein the mechanism raises or lowers the heads for respectively executing a read/write operation or non-operation.

10 Claims, 5 Drawing Figures

HEAD LOADING AND UNLOADING MECHANISM FOR MAGNETIC FLEXIBLE DISK

BACKGROUND OF THE INVENTION

1. Field of the Invention

This invention relates to read/write heads used with respect to a magnetic disk, and in particular relates to the loading and unloading of such heads onto a flexible disk.

2. Description of the Prior Art

In known prior art head loading mechanisms for a double-sided, single disk or diskette system, a wear problem is sometimes found to exist on the disk's magnetic surfaces. Severe disk wear can be caused by an insufficient control of the head loading velocity. Additional disk wear is generated because load springs which are coupled to the heads for bringing them in contact with the disk surfaces are not sufficiently matched or eventually become out of tolerance so that an uneven disk/head interface is created and a wear condition is produced.

Another recognized shortcoming of the known prior art is that in the unloaded state, only one head is withdrawn from the disk surface and one head remains stationary. Consequently, a wear problem is created by continually having one head in semi-contact with a disk surface in the unloaded position.

Finally, the prior art does not have a simple adjustment techniques which will enable a single disk system to be centered. into its normal plane of rotation. The ability to center a disk in its plane of rotation is significant during the loading operation in order that good performance may be obtained in either read/write operations.

SUMMARY OF THE INVENTION

The present invention permits the loading or unloading of read/write heads for double-sided operation of a flexible or floppy disk. In the preferred embodiment, the mechanism is utilized with a multi-disk pack. A slotted arm is provided for insertion into the rotating disk pack in such a way that a selected disk is positioned within the slot of the arm. Deflector blades are provided so that adjacent disks to the selected disk are deflected away therefrom to permit access thereto.

Loading or unloading of the heads is accomplished after the selected disk is positioned within the head arm slot. The head loading mechanism centers the selected floppy disk within the head arm slot by releasing a load spring which causes the head on one side of the disk to contact one magnetic surface thereof, and by simultaneously releasing a second load spring which causes the head on the second side of the disk to contact the other magnetic surface.

The two load springs have a different spring force which biases the heads toward an adjustable stop. The adjustable stop allows the selected disk to be centered within the slot.

In effect, in the loaded state when both heads are in contact with the selected disk, the head with the lesser spring force positioned against the stop acts as a fixed head and the head with the greater spring force is free to position itself against the fixed head position. In the unloaded state, both heads are retracted to prevent touching the selected disk.

The landing of the heads on the respective magnetic surfaces during the loading operation is characterized by a landing velocity which approaches zero. This gentle landing of the respective heads on the disk accounts for minimum wear problems being produced on the disk.

Stabilization means are also provided for mechanically stabilizing the selected disk in order to prevent any flopping thereof and to provide a stable head/disk interface.

It is therefore an object of this invention to provide a head loading mechanism for a floppy disk which eliminates any effects of force tolerances of the head load springs in the loaded position.

It is another object of this invention to avoid disk wear by controlling the velocity and motion characteristics with which the heads are lowered onto the disk surfaces during loading.

It is another object of this invention to prevent both heads from touching the selected disk in the unloaded position.

It is still another object of this invention to provide a simple arrangement for centering the selected disk within the slot when the heads are in the loaded position.

BRIEF DESCRIPTION OF THE DRAWINGS

FIG. 1a is a side view of the head arm of FIG. 1.

DESCRIPTION OF THE PREFERRED EMBODIMENT

Figure 1:
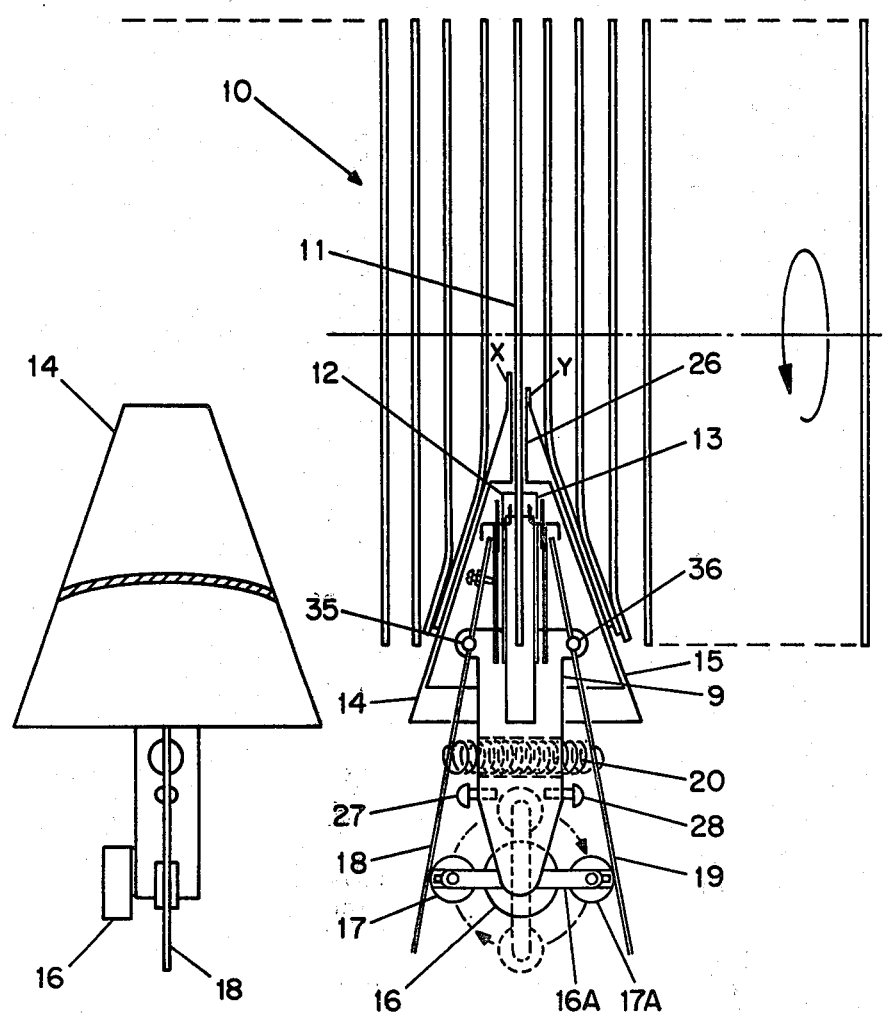
FIG. 1 is an illustration of the double-sided head arm utilized with a multi-disk file in the loaded position.

Referring now to FIG. 1 in greater detail, a multi-disk file 10 is shown wherein a single disk 11 has been selected by means of an accessing mechanism (not shown) as disclosed in co-pending patent application filed Oct. 17, 1978, Ser. No. 958,599. With help of the accessing mechanism, a head arm or support 9 is inserted into the rotating disk file 10 in such a way that the selected disk 11 falls within slot 26 of head arm 9. It should be understood by those skilled in the art that although the instant invention is described with respect to a multi-disk file where the rotating disks are fixed and the head is moveable, the invention is equally operative with a system where the head is fixed and a single disk is moveable for insertion into the head.

When the selected disk 11 is maintained in the head arm slot 26 the disk 11 is between read/write magnetic heads 12, 13. In order to separate immediately adjacent disks from the selected disk 11, deflector blades 14, 15 attached to the head arm 9 are utilized. FIG. 1 depicts the magnetic heads 12, 13 in a loaded (i.e., lowered) position or in a condition to perform a read/write cycle. As will be clearer in later discussions, in an unloaded state or raised position both heads 12, 13 will be withdrawn from the disk 11.

Figure 2:
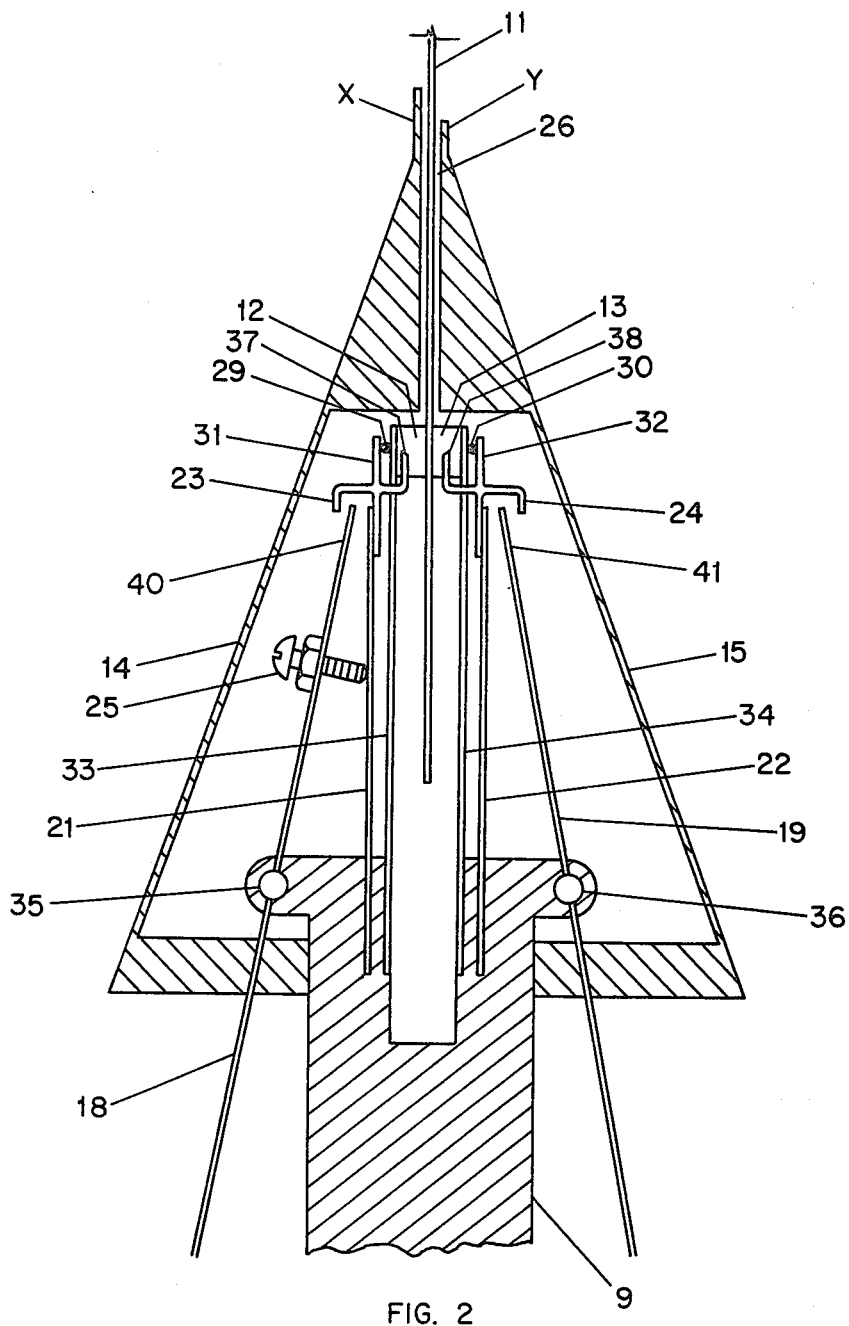
FIG. 2 is an enlarged, detailed view of the head mechanism in the loaded or lowered position.
Figure 3:
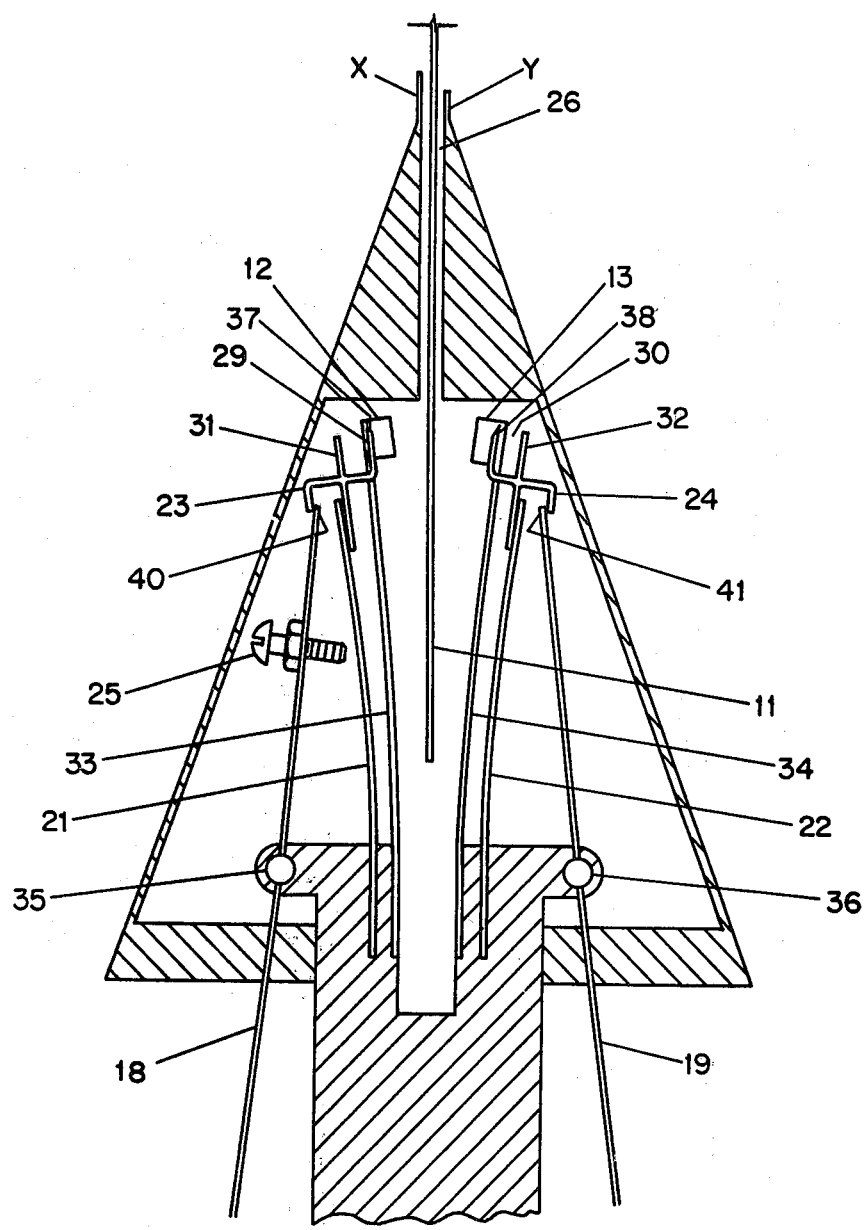
FIG. 3 is an enlarged detailed view of the head mechanism in the off or unloaded or raised position.

Referring now to FIG. 2 which depicts the loaded position of the heads 12, 13 in an enlarged and more detailed view, the magnetic heads 12, 13 are connected to flexure springs 33, 34 and head load springs 21, 22 are connected to lifting forks 37, 38, tips 31, 32 and hooks 23, 24. As is well known in the art, the flexure springs 33, 34 hold the magnetic heads 12, 13 in position when they are in contact with the disk 11. The flexure springs 33, 34 are flexible enough to allow the heads to align themselves parallel to the surfaces of the selected disk. The spring force exerted by the flexure springs is negligible.

It is also well known in the art that the load springs 21, 22 cause the magnetic heads 12, 13 to contact disk 11 via their respective spring forces, which is transmitted via tips 31, 32 and load pivots 29, 30. As was previously mentioned, difficulty has been encountered in the known prior art in obtaining load spring 21, 22 which are equalized so that the disk 11 is maintained in its normal plane of rotation or in the center of slot 26. In the present invention, load springs 21, 22 have unequal spring forces of approximately 6 and 10 grams, respectively. In accordance with this invention, the force of load spring 21 in the loaded position is adjusted to be 20 to 40% less than the force of load spring 22. Therefore, this force difference will bias the heads toward the left the reason for which will become apparent hereinafter.

Referring again to FIG. 1 and in accordance with this invention, a rotary solenoid 16, which is connected to the head arm 9, has two attached cams 17, 17a that move in a clockwise direction when the solenoid is electrically energized. In an unenergized state the cams 17, 17a are vertical as depicted in dotted form, whereas they are horizontal when in the energized state and in touching relationship with actuating levers 18, 19. In the unenergized position, the actuating levers 18, 19 can be adjusted to an off position by means of adjusting screws 27, 28.

Actuating levers 18, 19 are positioned on support 9 by means of pivots 35, 36. When the solenoid 16 is energized spring 20 urges the actuating levers 18, 19 against cams 17, 17a. In other words, spring 20 holds actuator levers 18, 19 in contact with cams 17, 17a. The length of the stroke of levers 18, 19 is adjusted by sliding of cams 17, 17a on solenoid bar 16a.

Returning again to FIG. 2, when the magnetic heads 12, 13 are to be loaded onto the disk 11 for a read/write operation, the rotary solenoid 16 is energized to thereby cause cams 17, 17a to be rotated to the horizontal position thereby causing the actuating levers 18, 19 to rotate around pivots 35, 36 so that hooks 23, 24 become disengaged from lever ends 40, 41. Also lifting forks 37 and 38 become disengaged from heads 12 and 13.

By disengaging the actuating levers 18, 19 from hooks 23, 24, the load spring 22 which has a spring force of 10 grams will urge magnetic head 13 against disk 11 with slightly more force than will load spring 21 urge head 12 against the disk 11 since the differential spring force provided by the load springs 21, 22 is in a leftward direction as viewed in the drawing.

Adjustment screw 25 is attached to the actuating lever 18. Since as mentioned above the load spring 22 exerts a higher force on head 13 than does load spring 21 upon head 12, the spring force differential biases both heads 12, 13 to the left until load spring 21 touches adjustment screw 25.

It should be noted hereat that the actuating lever 18 is fixed in the loaded position by the cam 17 (FIG. 1) and the spring 20 so that it cannot move about the pivot 35. Accordingly, the adjusting screw 25 is fixed and exerts an adjustable force against one side of the load spring 21. Furthermore, the differential bias that has been established through the load springs 21, 22 prevents the load spring 21 from moving away from the adjusting screw 25. Therefore, the head 12 has assumed a fixed position against one side of disk 11 and head 13 is free to float against the fixed head 12. It should be additionally noted that adjusting screw 25 also functions to align disk 11 within the center head arm slot 26.

The instant invention is characterized by minimum wear to the flexible disk 11 (FIG. 1) after repeated loadings of the heads 12, 13 on the disk 26. This is a significant feature of the invention because of a noted tendency of the flexible disk 11, whose thickness is on the order of 3.2 mils, to wear. The minimum wear factor is achieved by this invention due to the near zero landing velocity of the heads 12, 13 upon the disk 11.

In accordance with this invention the landing velocity is low and approaches zero for two reasons which are discussed below. By referring to FIG. 1 it can be readily seen that head loading is accomplished through cam action which is applied through the cams 17, 17a, actuating levers 18, 19 and pivots 35, 36. As previously mentioned, the extremities of actuating levers 18, 19 respectively engage or disengage from hooks 23, 24 to unload or load the heads 12, 13 on disk 11.

It should be particularly noted that a ratio of distances along an actuating lever 18 is established wherein the first distance extends from the pivot point 35, for example, to the lever end 40 and the second distance extends from the same pivot point to the extremity where the actuating lever touches the cam 17. This ratio is approximately 7 to 1 although this scale is not apparent since the drawing is not drawn to scale. Accordingly, the angular velocity at the lever end 40, which controls the loading speed of head 12, is reduced to one seventh of the speed with which cam 17, driven by solenoid 16, activates on lever 18. It should be understood that the above analysis applies as well to lever 19.

In addition to the reduced one-seventh angular velocity achieved by the lever action above-described, the loading velocity of the head approaches zero due to a simple harmonic motion of the cam when moving from the unloaded to the load position. In other words, because of a sinusoidal character of the rotating cams 17, 17a, the velocity approaches zero when the heads 12, 13 approach disk 11.

In summary therefore, applying the sinusoidal or harmonic motion to the actuating levers which are divided into approximately a seven-to-one ratio by the pivots 35, 36 provides two effects which are instrumental in reducing wear upon the flexible disk:

a. the velocity attained by the lever ends 40, 41 and therefore the heads at the time the heads touch the disk (e.g., 17, FIG. 1) approaches zero due to the sinusoidal motion characteristics of the rotary solenoid b. due to the position of the pivot points 35, 36 the angular velocity of the lever ends (e.g., 40, 41, FIG. 2) is approximately one-seventh the angular velocity of the solenoid cams in rotating from the unloaded to load positions and vise versa (see FIG. 1).

Mechanical stabilization of rotating disk 11 is achieved in accordance with this invention by providing air foil-like blades which are arranged to prevent the disk 11 from flopping freely within the slot 26 so that excessive head, disk wear is prevented. In other words, by eliminating flopping of the disk 11, a smooth interface is provided between the heads 12, 13 and the disk 11 so that excessive wear of the magnetic surfaces of disk 11 is minimized or eliminated.

Figure 4:
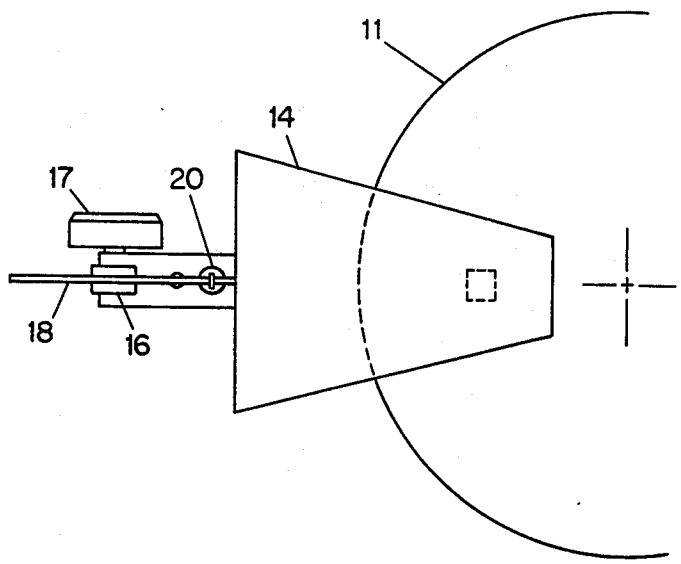
FIG. 4 is a side view of an air foil stabilization embodiment utilized with this invention.
Figure 4A:
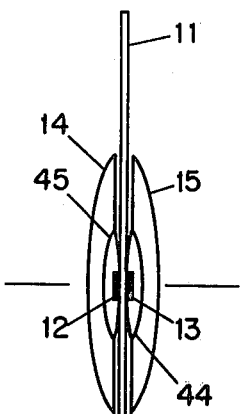
FIG. 4A is a sectional view of the embodiment of FIG. 4.

FIG. 4 depicts a side view and FIG. 4a shows an end view of one embodiment of the present invention using air foil-like blades 44, 45. The blades 44, 45 are located as inside surfaces of slot 26. The rotating of the disk 11 with the air foil-like configuration creates an air bearing on either side of the disk 11 so that it becomes mechanically stable.

Figure 5:
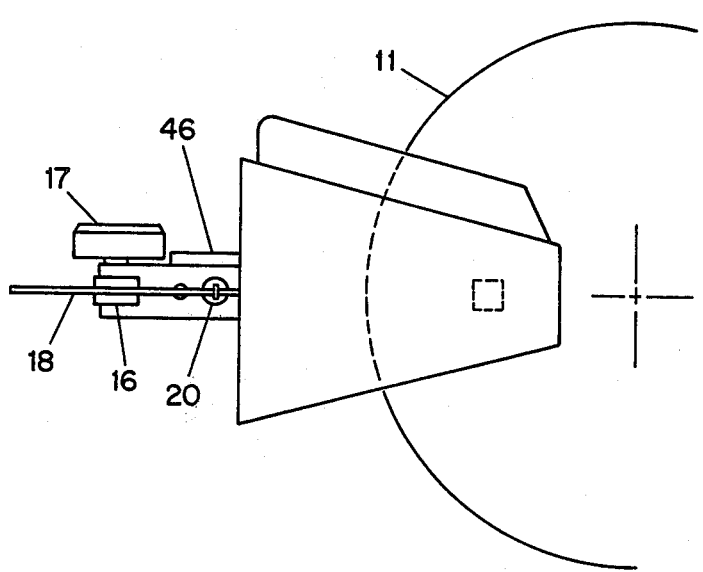
FIG. 5 is a side view of another air foil stabilization embodiment utilized with this invention.
Figure 5A:
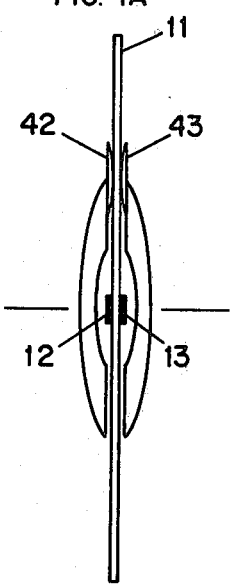
FIG. 5A is a sectional view of the embodiment of FIG. 5.

FIG. 5 depicts a side view and FIG. 5a shows an end view of another embodiment of the air foil-like configuration wherein air foil-like blades 42, 43 are positioned on the head arm where the disk 11 enters slot 26.

It will be recalled that the embodiments of FIGS. 1–5 are utilized in particular with the previously mentioned co-pending application wherein the unequal extensions X, Y are utilized for selecting the desired disk of file 10 (FIG. 1). It should be understood, however, that the invention may be readily utilized with just a single diskette whereby the extensions X, Y and deflector blades 14, 15 are not utilized.

In summary, the invention described above provides withdrawn magnetic heads in the unloaded position so that wear does not occur when the head arm 9 is inserted or withdrawn from a disk file 10. It is clear that if a single diskette system were used in accordance with the head withdrawal principle in the unloaded state of this invention, a wear problem would be similarly avoided by the continual insertion and withdrawal of a diskette with respect to a fixed head. Furthermore, when the two heads are loaded onto a disk 11 in accordance with this invention one becomes fixed and the other is allowed to float. This arrangement of the heads is also significant in reducing wear because it aids in maintaining the selected disk 11 in its normal plane of rotation and for maintaining a flat and stable disk/head interface.

I claim:

1. The method of loading and unloading read/write heads with respect to a double-sided, magnetic, flexible and rotating disk, the improvement comprising the steps of:
    (a) applying unequal spring forces against said respective heads;
    (b) fixing the head to which the lesser spring force is applied against one side of the disk when in a loaded condition; and
    (c) allowing the head to which the greater spring force is applied to contact a second side of the disk when in a loaded condition;
    (d) loading said heads onto said disk with a periodic motion;
    (e) simultaneously withdrawing both said heads from said disk when unloading said heads from said disk;
    (f) said periodic motion causing said heads to be loaded onto said recording disk with substantially zero velocity.

2. A loading mechanism for positioning read/write heads with respect to a double-sided, magnetic, rotating, flexible recording medium comprising:
    (a) first and second magnetic heads, for recording, or alternatively reading information on said medium;
    (b) first and second load springs wherein a respective spring is attached to a different one of said magnetic heads,
    (c) abutment means,
    (d) each said load spring having a different spring force to differentially bias the heads against said medium in a direction wherein the load spring with the lesser force contacts the abutment means,
    said differential spring force and abutment means maintaining said medium in its normal plane of rotation.

3. The loading mechanism in accordance with claim 2 wherein said abutment means is adjustable for changing the plane of rotation of said disk.

4. A moveable read-write head arrangement for a rotating, flexible multiple disk file system, comprising:
    (a) a pair of juxtaposed deflector blades fixed relative to each other and having a gap therebetween for receiving a rotating disk of said file system in said gap;
    (b) a pair of read/write heads positioned on either side of said gap;
    (c) a support arm radially aligned with the gap;
    (d) an abutment means;
    (e) a pair of flexure springs on the support arm, a different one of said heads being attached to a respective flexure spring;
    (f) a pair of head load springs on said support arm wherein a different load spring is attached to a different one of said heads and each said load spring having a different spring force to differentially bias said heads against said disk such that the lesser force spring contacts the abutment means;
    (g) loading-unloading means including a lever mounted on said support arm engageable with said load spring for retracting said heads and for engaging said read/write heads with said disk whereby said abutment means and said differential bias maintain said disk within said slot.

5. The moveable read-write head in accordance with claim 4 wherein said abutment means is adjustable for changing the plane of rotation of the disk within said slot.

6. The moveable read/write head arrangement in accordance with claim 4 wherein said loading and unloading means further includes,
    (a) a cam means for engaging said levers to position said heads against said disk in the loading portion, and
    (b) for disengaging said levers to position said heads away from said disk in the unloading position.

7. The moveable read/write head arrangement in accordance with claim 4 wherein said cam means is adjustable.

8. The moveable read/write head arrangement in accordance with claim 4 wherein said cam means is actuated to the loading-unloading position by a rotary solenoid means,
    said solenoid means in the energized condition causing said cam means to engage said levers to load said heads onto said disk, and
    said solenoid means in the unenergized condition causing said cam means to disengage from said levers to unload said heads from said disk.

9. The moveable read/write head arrangement in accordance with claim 4 wherein means are positioned in the vicinity of said gap for stabilizing said disk when said heads perform a read/write operation.

10. A device for positioning read/write heads with respect to a double-sided, magnetic, rotating, flexible recording medium comprising:
 (a) first and second magnetic heads for alternatively reading and recording information on said medium;
 (b) first spring means coupled to said first magnetic head for allowing said first head to positively contact a surface of the recording medium;
 (c) second spring means coupled to said second magnetic head for allowing said second head to positively contact an opposite surface of the recording medium;
 (d) said second spring having a greater spring force than said first spring;
 (e) an adjustable stop means coupled to said first head;
 (f) means having a periodic motion for loading said heads onto the surfaces of the recording medium, such that said second head is urged against said first head until said stop means prevents said first head from moving further, said periodic motion means causing said heads to be loaded onto said recording medium with substantially zero velocity.

* * * * *